United States Patent
Dammann et al.

(10) Patent No.: US 6,183,608 B1
(45) Date of Patent: Feb. 6, 2001

(54) ELECTRODE POSITIONING MECHANISM

(76) Inventors: Wilbur A. Dammann, 1115 Carriage Rd., Papillion, NE (US) 68046; W. David Wallman, 1350 Northface Ct., Colorado Springs, CO (US) 80919

(*) Notice: Under 35 U.S.C. 154(b), the term of this patent shall be extended for 0 days.

(21) Appl. No.: 09/244,620

(22) Filed: Feb. 4, 1999

Related U.S. Application Data

(60) Provisional application No. 60/073,819, filed on Feb. 5, 1998.

(51) Int. Cl.⁷ .................................................. C25D 17/00
(52) U.S. Cl. ............................................................. 204/222
(58) Field of Search .................................. 204/199, 225, 204/228.8, 222, 286

(56) References Cited

U.S. PATENT DOCUMENTS

| | | | |
|---|---|---|---|
| 3,980,802 | * 9/1976 | Paton et al. | 13/18 |
| 4,306,193 | * 12/1981 | Potter | 328/146 |
| 5,093,977 | * 3/1992 | Muller et al. | 29/568 |
| 5,159,900 | 11/1992 | Dammann | 123/3 |
| 5,417,817 | 5/1995 | Dammann et al. | 204/129 |
| 5,417,818 | * 5/1995 | Dammann et al. | 204/129 |
| 5,628,348 | * 5/1997 | Scott et al. | 140/123.5 |
| 5,647,407 | * 7/1997 | Scott et al. | 140/123.5 |

* cited by examiner

Primary Examiner—Kathryn Gorgos
Assistant Examiner—Erica Smith-Hicks
(74) Attorney, Agent, or Firm—Koley Jessen P.C. A Limited Liability Organization; Mark D. Frederiksen

(57) ABSTRACT

The electrode positioning mechanism includes a reversible electric motor. The motor rotates a worm gear which drives a spur gear. The spur gear is connected to an internally threaded collar which is adapted to receive an externally threaded sleeve. The sleeve can move axially lengthwise with respect to the collar. The sleeve acts as a housing for the electrode. Means are provided to retain the sleeve within the collar such that mechanical movement is restricted. The restriction in mechanical movement causes the torque applied by the worm gear to increase. The worm gear is allowed to move axially along the length of the motor shaft. The worm gear is biased into a longitudinally central position by at least one spring. As torque increases, the worm gear is moved from its central position against the urging of the spring. The worm gear is also connected to a washer with a diameter greater than that of the worm gear. The washer moves with the worm gear and is in communication with a switching means that will reverse the direction of the motor when one washer is so moved.

5 Claims, 4 Drawing Sheets

ELECTRODE POSITIONING MECHANISM

CROSS-REFERENCE TO RELATED APPLICATION

Applicants filed a provisional application as a small entity entitled ELECTRODE POSITIONING MECHANISM which was accorded Ser. No. 60/073,819 and a filing date of Feb. 5, 1998.

TECHNICAL FIELD

The present invention relates generally to a mechanism for positioning an electrode, and more specifically to the positioning of an electrode within a carbon arc liquid gasification apparatus.

BACKGROUND OF THE INVENTION

In U.S. Pat. No. 5,159,900, one of the inventors herein discloses a rapid oxidation process to produce a gas for use as a fuel from water and carbon. This gas product is created by the decomposition of water or a water-based solution through oxidation. Hydrogen is displaced when a substance is oxidized in water. Rapid oxidation can be forced by using an electrical arc to burn a substance within a biomass feedstock solution, thereby oxidizing the substance by an electro-thermochemical reaction. The result is the rapid formation of a compound of hydrogen and carbon monoxide gas ($COH_2$).

As discussed in U.S. Pat. No. 5,159,900, a problem arises in the storage of $COH_2$ gas, and therefore it is desirable to produce $COH_2$ gas on an on-demand basis. U.S. Pat. No. 5,159,900 to Wilbur Dammann discloses the use of an electrical arc between two carbon electrodes submersed in water to produce the reaction necessary to rapidly oxidize carbon and produce $COH_2$ gas.

In U.S. Pat. No. 5,417,817, the inventors disclose a method for producing on-demand generation of gas from water and carbon which continuously replenishes the carbon electrodes from a biomass feedstock, to avoid the need for replacing the electrodes. Among the features disclosed in U.S. Pat. No. 5,417,817 is a servo drive which adjusts the position of one of the electrodes until the electrodes are at optimum spacing for most efficient operation. Because the movable electrode must be able to move toward or away from the stationary electrode, the mechanism which positions the electrode must work in forward and reverse directions. Furthermore, the mechanism must be able to sense the forward and rearward limits of motion of the electrode. Finally, the mechanism must position the carbon electrodes such that excessive contact pressure is avoided when initially striking the arc.

SUMMARY OF THE INVENTION

It is therefore a general object of the present invention to provide an electrode positioning mechanism which can move an electrode in a forward and rearward direction.

Another object is to provide an electrode positioning mechanism which can sense the limits of mechanical movement of an electrode and activate switches for changing the direction of movement of the electrode.

Another object is to provide an electrode positioning mechanism which can protect the carbon electrode from excessive contact pressure when the arc is initially struck.

These and other objects will be apparent to those skilled in the art.

The electrode positioning mechanism includes a reversible electric motor. The motor has a shaft that rotates a worm gear which drives a spur gear. The spur gear is connected to an internally threaded collar which is adapted to receive an externally threaded sleeve. The sleeve can move axially lengthwise with respect to the collar. The sleeve acts as a housing for the electrode. Means are provided to retain tile sleeve within the collar such that mechanical movement is restricted when the sleeve reaches the limitation of its motion. The restriction in mechanical movement causes the torque applied by the worm gear to increase. The worm gear is allowed to move axially along the length of the motor shaft, but is biased into a longitudinally central position by at least one spring. As torque increases, the worm gear is moved from its central position against the urging of the spring. The worm gear is also connected to a washer with a diameter greater than that of the worm gear. The washer moves with the worm gear and is in communication with a switching means that will reverse the direction of the motor when the washer is so moved. The reversal in the direction of the motor dissipates the amount of torque applied to the worm gear, which returns to its central position.

DESCRIPTION OF THE PREFERRED EMBODIMENT

Figure 1:
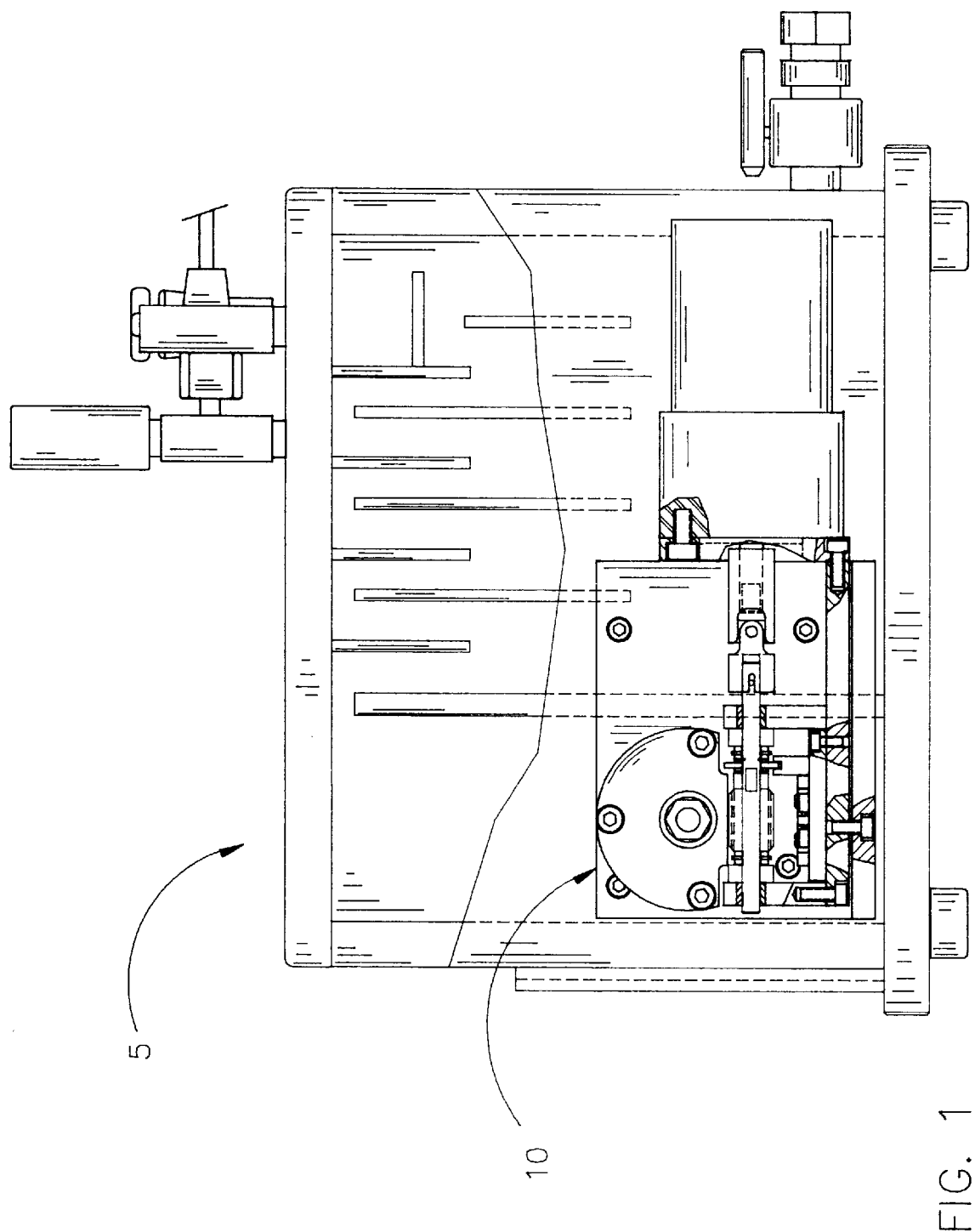
FIG. 1 is a sectional side view of the electrode positioning mechanism within a liquid gasification apparatus.

In FIG. 1, the numeral 5 refers to a liquid gasification apparatus. The numeral 10 refers to the electrode positioning mechanism which will be described, for the purposes of this disclosure, as a component of the liquid gasification apparatus 5.

Figure 2:
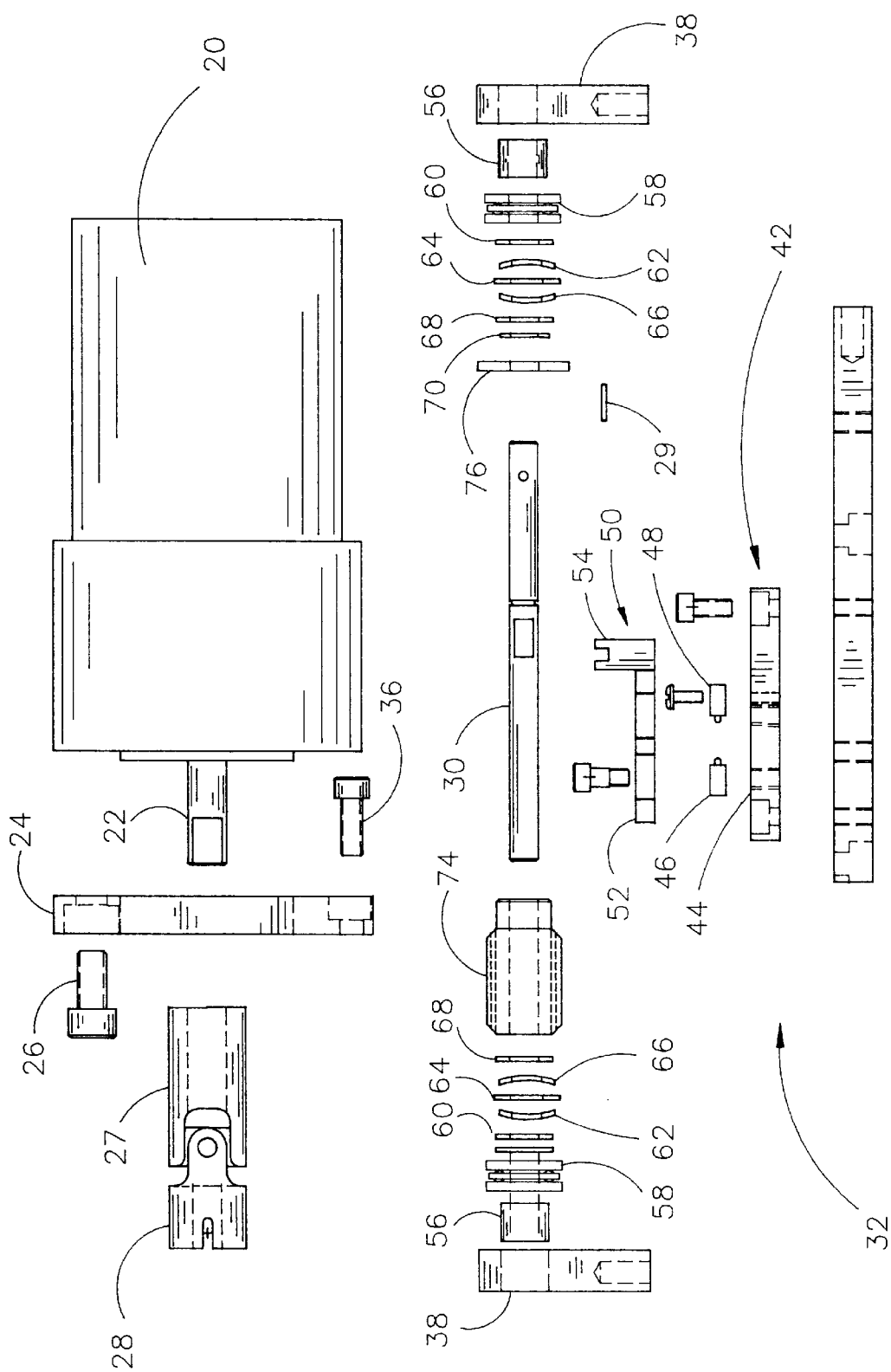
FIG. 2 an exploded side view of the electric motor and worm gear mechanism.

In FIG. 2, the numeral 20 refers to a reversible electric motor. The motor :20 includes a drive shaft 22. The motor 20 is held in place by a motor support 24 to which it is secured by a plurality of bolts 26. The drive shaft 22 is connected to a universal joint 27. The universal joint 27 is connected to a shaft 30 such that the shaft 30 may move axially lengthwise in relation to the universal joint 27. This is achieved by providing universal joint 27 with an elongated cavity 28 and shaft 30 with a pin 29 which pin 29 is slidable axially lengthwise within the elongated cavity 28.

The shaft 30 is rotatably supported by a frame 32. The frame 32 includes a lower plate 34. The lower plate 34 is secured to motor support 24 by at least one bolt 36. The lower plate 34 is connected to distal shaft supports 38 by a plurality of bolts 40 and is also connected to a switch plate 42. The switch plate 42 includes a fixed switch bracket 44 which houses two switches 46 and 48. The switch bracket 44 also includes a contact lever 50. The contact lever 50 has an actuator 52 which rests between the switches 46 and 48. The switches 46 and 48 are arranged such that movement of the contact lever 50 in a direction along the length of shaft 30 will cause the actuator 52 to activate either the switch 46 or the switch 48, depending on the direction of the movement. The switch lever 50 also includes a grooved extension 54.

The shaft 30 is supported by the shaft supports 38 such that the shaft 30 is allowed to move axially lengthwise. At both ends of the shaft 30, and within the shaft supports 38, the following parts are mounted on shaft 30 in the following order, from the distal end toward the center of the shaft 30: a sleeve bearing 56, a thrust bearing 58, a nonmetallic washer 60, a first spring washer 62, a first flat washer 64, a second spring washer 66, and a second flat washer 68. A retaining ring 70 is mounted on the shaft 30 proximal the second flat washer 68 on the end of the shaft 30 proximal the motor 20. A worm gear 74 is mounted at the approximate center of the shaft 30 and is mounted such that rotation of the shaft 30 results in rotation of the worm gear 74. An oversized washer 76 is mounted on shaft 30 and biased between the retaining ring 70 and the worm gear 74. The outer diameter of the oversized washer 76 is adapted to be received into the grooved extension 54 of the contact lever 50.

Figure 3:
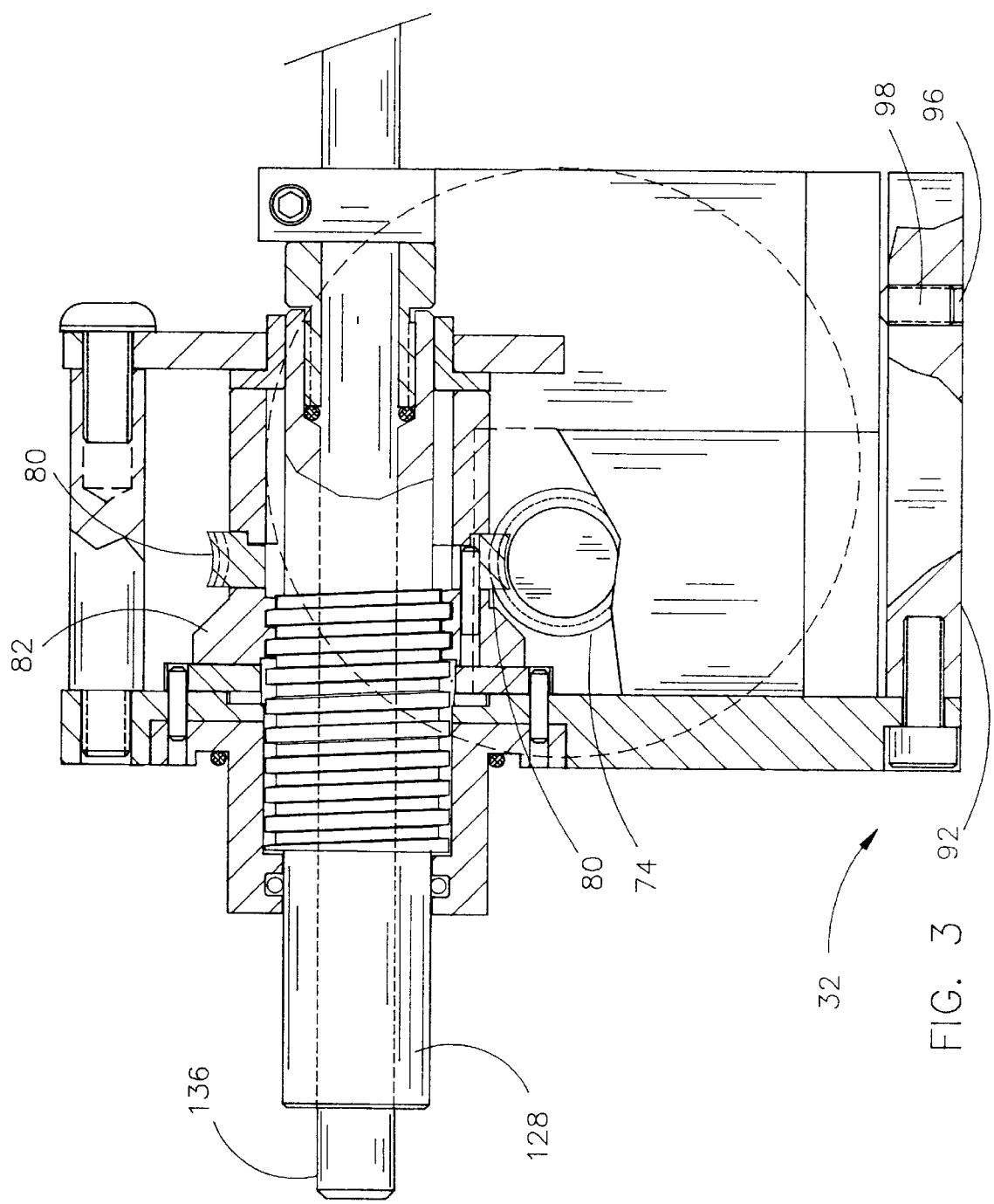
FIG. 3 is a front sectional view of the interaction between the electric motor and worm gear mechanism with the spur gear, internally threaded collar and externally threaded sleeve mechanism.

As shown in FIG. 3, the worm gear 74 is operatively meshed with a spur gear 80.

Figure 4:
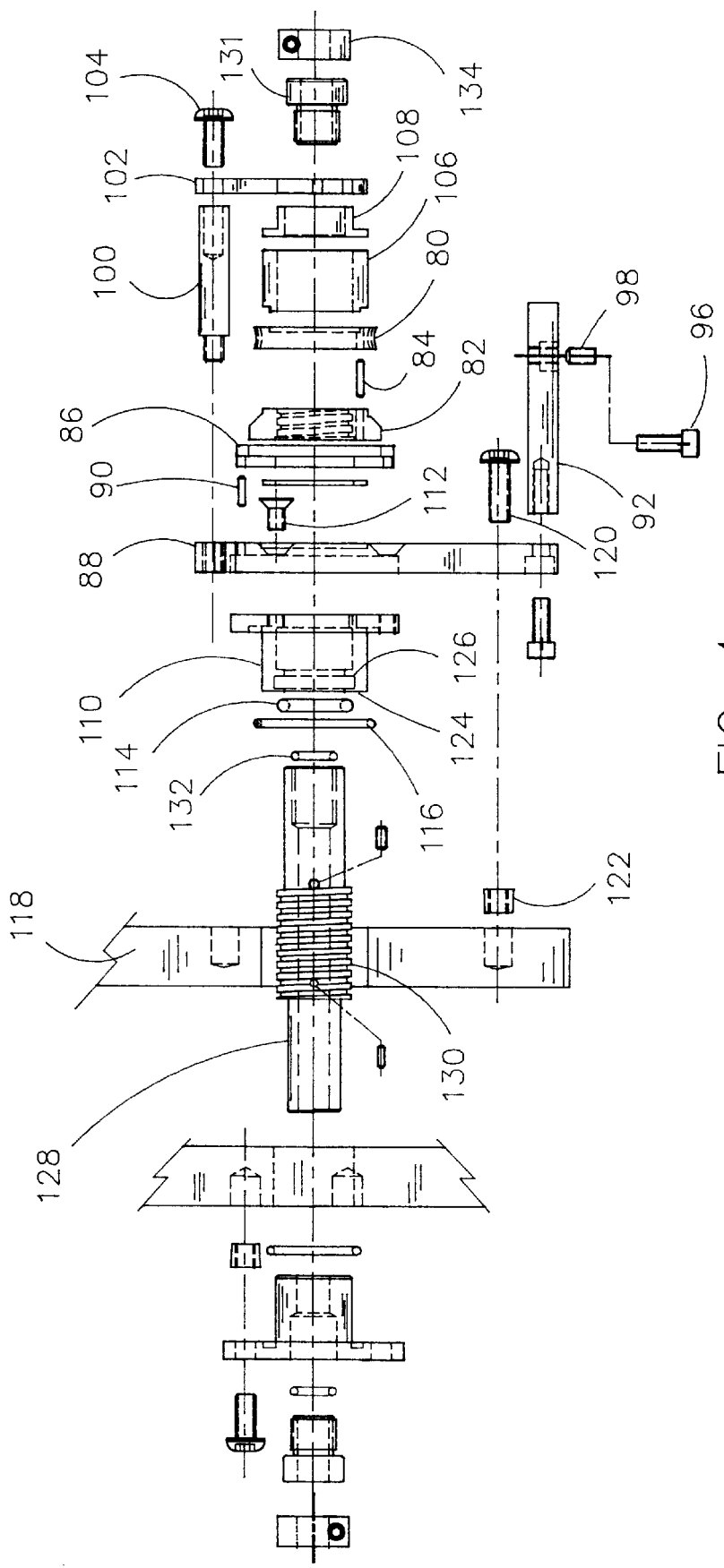
FIG. 4 is an exploded front view of the spur gear, internally threaded collar and externally threaded sleeve mechanism.

As shown in FIG. 4, the spur gear 80 is affixed to an internally threaded collar 82 by a dowel pin 84. The collar 82 rests against a nylon washer 86 which is affixed to the mounting plate 88 by dowel pin 90. The mounting plate 88 is affixed to a lower mounting plate 92 by at least one bolt 94. A lower mounting plate 92 is connected to the underside of the 32 (shown in FIG. 3) by at least one bolt 96 and at least one set screw 98.

At its upper end, the mounting plate 88 is connected to a spacer 100. A bearing plate 102 is connected to the spacer 100 by a bolt 104. A nylon worm gear spacer 106 and a bearing 108 are provided between the bearing plate 102 and the mounting plate 88. The bearing 108 is adapted to fit in an aperture in the bearing plate 102. A worm gear spacer 106 abuts the spur gear 80 such that the spur gear 80 and the collar 82 are free to rotate.

A screw housing 110 is affixed to the opposite side of the mounting plate 88 by at least one bolt 112. The screw housing 110 has an aperture adapted to receive an O-ring 114 and an annular flange with an annular groove adapted to receive an O-ring 116. The screw housing 110 also includes a barrel adapted to fit into an opening of the reactor wall 118. The mounting plate 88 and the screw housing 110 are affixed to the reactor wall 118 by at least one bolt 120 and threaded insert 122. A substantially cylindrical chamber is thereby formed by the aperture in the screw housing 110, an aperture in the mounting plate 88, an aperture in the nylon washer 86, internally threaded aperture in the collar 82, an aperture in the spur gear 80, and an aperture in the worm gear spacer 106. The aperture in the screw housing 110 is provided with a first annular ridge 124 and a second annular ridge 126 which are adapted to house the O-ring 114. The second annular ridge 126 also defines a narrower opening than that found in the substantially cylindrical opening previously described. A similarly narrow opening is defined at the opposite end of the substantially cylindrical opening described above by the bearing 108.

A hollow bolt 128 is provided having a central, externally threaded portion 130 with a diameter larger than that of the bolt 128 generally. The externally threaded portion 130 of the bolt 128 is positioned within the cylindrical aperture previously described and in operational engagement with the collar 82. The diameter of the externally threaded portion 130 of the bolt 128 is larger than the diameter of the narrow opening defined by either the second annular ridge 126 or the bearing 108. The bolt 128 is provided with an enlarged opening at its rearward end. The enlarged opening is adapted to receive a carbon rod fitting 131. The forward end carbon rod fitting 131 and the annular shoulder at the forward edge of the enlarged opening create an annular groove adapted to fit an O-ring 132.

The hollow bolt 128, the carbon rod fitting 131, and a carbon rod clamp 134 define an open-ended cylindrical bore into which carbon electrode 136 is journaled.

In operation, movement of the electrode 136 is caused by rotation of the shaft 30 and the worm gear 74 by the motor 20. The rotation of worm gear 74 causes the rotation of the spur gear 80 and the collar 82. The rotation of the collar 82 causes the axial lengthwise movement of the hollow bolt 128. The hollow bolt 128 will move axially lengthwise until the externally threaded portion 130 abuts either the second annular ridge 126 or the bearing 108, depending on the direction of its movement.

Upon reaching this mechanical limit of range of motion, the hollow bolt 128 will resist the rotation of the collar 82. The resistance to rotation of the collar 82 is translated through the spur gear 80 to the worm gear 74 in the form of increased torque. The increase in torque to the worm gear 74 will cause it to move axially lengthwise against the urging of the first and second spring washers 62 and 66. Axial lengthwise movement will also be realized by the oversized washer 76. The movement of the oversized washer 76 will cause the movement of the grooved extension 54 and thereby cause the contact lever 52 to activate either of the switches 46 or 48, depending on the movement of the worm gear 74. The activated switch, either the switch 46 or the switch 48, will cause the motor 20 to reverse direction. This feature prevents damage to the drive assembly at its mechanical limits. This feature also protects the carbon electrodes from excessive contact pressure when an arc is initially struck.

Thus it can be seen that the invention accomplishes all of its stated objectives.

We claim:

1. An electrode positioning mechanism, comprising:
   a reversible electric motor having a rotating drive shaft, said motor mounted on a support frame;
   a worm gear mounted on a gear shaft for rotation therewith, the gear shaft connected to said drive shaft for rotation therewith;
   said gear shaft mounted between a pair of supports on said frame for rotational movement on a rotational axis and axial slidable movement along the rotational axis;
   biasing means interposed between the supports and the worm gear for biasing the worm gear to a central location between the supports;
   a spur gear in operative engagement with said worm gear;
   an internally threaded collar having an axis affixed to said spur gear;
   an externally threaded sleeve coaxial with said internally threaded collar and having an axial opening therethrough and received by said internally threaded collar wherein rotation of said internally threaded collar about said axis causes the axial lengthwise movement of said externally threaded sleeve;
   an electrode positioned in said opening in said externally threaded sleeve for movement therewith;
   switching means connected to said reversible electric motor for reversing the direction of rotation of said drive shaft; and position sensing means mounted on said frame, for detecting axial movement of the worm gear and shaft in first and second directions along the gear shaft axis;

said position sensing means connected to said switching means to reverse the motor upon detection of movement of the gear shaft in the first or second directions.

2. The electrode positioning mechanism of claim 1 wherein said position sensing means includes a washer connected to said gear shaft, and said switching means includes at least one switch in communication with said washer wherein axially lengthwise movement of said worm gear causes said washer to move lengthwise to activate said switch.

3. The electrode positioning mechanism of claim 1 in which said spur gear and said internally threaded collar are an integral unit.

4. The electrode positioning mechanism of claim 1, wherein said position sensing means includes an actuator connected to the gear shaft for axial movement therewith, said actuator depending from said gear shaft; and a first and second switch positioned on opposite axial sides of the actuator and positioned for actuation upon movement of the actuator in a first or second axial direction with the gear shaft.

5. In combination:

a liquid gasification apparatus comprising:

a reaction chamber having fluid therein;

a pair of spaced-apart carbon electrodes immersed in said fluid;

means for supplying electrical current to the electrodes to create an electric arc therebetween; and a reversible electric motor having a rotating drive shaft, said motor mounted on a support frame;

a worm gear mounted on a gear shaft for rotation therewith, the gear shaft connected to said drive shaft for rotation therewith;

said gear shaft mounted between a pair of supports on said frame for rotational movement on a rotational axis and axial slidable movement along the rotational axis;

biasing means interposed between the supports and the worm gear for biasing the worm gear to a central location between the supports;

a spur gear in operative engagement with said worm gear;

an internally threaded collar having an axis affixed to said spur gear;

an externally threaded sleeve coaxial with said internally threaded collar and having an axial opening therethrough and received by said internally threaded collar wherein rotation of said internally threaded collar about said axis causes the axial lengthwise movement of said externally threaded sleeve;

an electrode positioned in said opening in said externally threaded sleeve for movement therewith;

switching means connected to said reversible electric motor for reversing the direction of rotation of said drive shaft; and position sensing means mounted on said frame, for detecting axial movement of the worm gear and shaft in first and second directions along the gear shaft axis;

said position sensing means connected to said switching means to reverse the motor upon detection of movement of the gear shaft in the first or second directions.

\* \* \* \* \*